US010451063B2

(12) United States Patent
Yoshida

(10) Patent No.: US 10,451,063 B2
(45) Date of Patent: Oct. 22, 2019

(54) VANE PUMP INCLUDING BACK PRESSURE GROOVES

(71) Applicant: JTEKT CORPORATION, Osaka-shi (JP)

(72) Inventor: Naohito Yoshida, Takahama (JP)

(73) Assignee: JTEKT CORPORATION, Osaka-shi (JP)

( * ) Notice: Subject to any disclaimer, the term of this patent is extended or adjusted under 35 U.S.C. 154(b) by 129 days.

(21) Appl. No.: 15/466,013

(22) Filed: Mar. 22, 2017

(65) Prior Publication Data

US 2017/0276133 A1  Sep. 28, 2017

(30) Foreign Application Priority Data

Mar. 28, 2016 (JP) ................. 2016-063779

(51) Int. Cl.
*F04C 15/06* (2006.01)
*F04C 2/344* (2006.01)
*F01C 21/08* (2006.01)
*F16H 61/00* (2006.01)

(52) U.S. Cl.
CPC .............. *F04C 15/06* (2013.01); *F04C 2/344* (2013.01); *F04C 2240/10* (2013.01); *F04C 2240/20* (2013.01); *F16H 61/0025* (2013.01)

(58) Field of Classification Search
CPC ...... F04C 15/06; F04C 2/344; F01C 21/0863; F01C 21/108
See application file for complete search history.

(56) References Cited

U.S. PATENT DOCUMENTS 9,638,190 B2 *   5/2017 Yoshida ................ F01C 21/108
2010/0329917 A1 * 12/2010 Ando .................. F01C 21/0863
                                                            418/133
2013/0280118 A1 * 10/2013 Akatsuka ............ F01C 21/0863
                                                            418/191

FOREIGN PATENT DOCUMENTS

JP         2001-27186         1/2001

* cited by examiner

*Primary Examiner* — Deming Wan
(74) *Attorney, Agent, or Firm* — Oblon, McClelland, Maier & Neustadt, L.L.P.

(57) ABSTRACT

A vane pump sucks the hydraulic fluid from a first inlet port and discharges it into a first outlet port and, at the same time, sucks the hydraulic fluid from a second inlet port and discharges it into a second outlet port, as a rotor having a plurality of slits housing vanes and extending in a radial manner rotates. The vane pump has a first back-pressure groove that is communicated with some of the slits to supply a back pressure from the first outlet port to the corresponding vanes and a second back-pressure groove that is communicated with other of the slits to supply a back pressure from the second outlet port to the corresponding vanes. The vanes to which the back pressure is supplied from the first back-pressure groove include the vanes in pump chambers into which the hydraulic fluid is sucked from the second inlet port.

4 Claims, 5 Drawing Sheets

VANE PUMP INCLUDING BACK PRESSURE GROOVES

INCORPORATION BY REFERENCE

The disclosure of Japanese Patent Application No. 2016-063779 filed on Mar. 28, 2016 including the specification, drawings and abstract, is incorporated herein by reference in its entirety.

BACKGROUND OF THE INVENTION

1. Field of the Invention

The invention relates to a vane pump including a rotor having a plurality of slits housing vanes and extending in a radial manner, the vane pump configured to discharge a fluid, sucked into the vane pump through inlet ports, to outlet ports as the rotor rotates.

2. Description of the Related Art

Vane pumps have been used to, for example, actuate various kinds of hydraulically-driven machines. Such a vane pump includes a rotor holding a plurality of vanes. As the rotor rotates in a cam ring having an inner peripheral cam face, a hydraulic fluid sucked into the vane pump through an inlet port is discharged into an outlet port. The vanes are housed in slits formed in the rotor in a radial manner, and the vanes are movable in a radial direction of the rotor. The vanes define a plurality of pump chambers between an outer peripheral surface of the rotor and the inner peripheral cam face. In some of these vane pumps, a cam ring has an elliptically-shaped inner peripheral cam face, and a first inlet port, a second inlet port, a first outlet port, and a second outlet port are open into a rotor chamber in the cam ring (see, for example, Japanese Patent Application Publication No. 2001-27186 (JP 2001-27186 A)).

In such a vane pump having two outlets, as the rotor rotates together with the vanes, the hydraulic fluid sucked into the vane pump through the first inlet port is discharged into the first outlet port and the hydraulic fluid sucked into the vane pump through the second inlet port is discharged into the second outlet port. This configuration makes it possible to supply a low-pressure hydraulic fluid and a high-pressure hydraulic fluid to hydraulic-fluid supply destinations, by varying the throttling amount between a fluid passage for the hydraulic fluid discharged into the first outlet port and a fluid passage for the hydraulic fluid discharged into the second outlet port.

The vane pump described in JP 2001-27186 A has a first back-pressure groove and a second back-pressure groove that are communicated with deep portions of the slits (i.e., portions of the slits that are close to the center of the rotor). The first back-pressure groove and the second back-pressure grove are used to push the vanes out of the slits and to push distal ends of the vanes against the inner peripheral cam face. The first back-pressure groove is communicated with the slits that house the vanes defining pump chambers communicated with the first inlet port and the first outlet port. The second back-pressure groove is communicated with the slits that house the vanes defining pump chambers communicated with the second inlet port and the second outlet port. The pressure in the first outlet port is introduced into the first back-pressure groove. The pressure in the second outlet port is introduced into the second back-pressure groove.

When a vane pump having two outlet ports as described in JP 2001-27186 A is used, for example, to actuate an automatic transmission of an automobile, the rotor is rotationally driven by the engine torque transmitted via a torque converter. Thus, the axis of rotation of the rotor is disposed horizontally. In this case, the vanes positioned above the axis of rotation of the rotor may move into the deep portions of the slits under their own weight.

When some of the vanes move into the deep portions of the slits, no pressure is generated in one of the first outlet port and the second outlet port, which is positioned on the upper side, and thus no pressure is introduced into the back-pressure groove communicated with the outlet port positioned on the upper side. Therefore, until the rotation speed of the rotor becomes high enough to allow the vanes to be centrifugally pushed out of the slits, the pressure in the outlet port positioned on the upper side may not increase. Such a phenomenon is particularly noticeable when the oil viscosity is high, for example, when a vehicle is started at a significantly low temperature of −30° C. or lower.

SUMMARY OF THE INVENTION

One object of the invention is to provide a vane pump configured to quickly increase the pressure of a fluid in each of a first outlet port and a second outlet port when a rotor starts rotating, even in a case where the axis of rotation of the rotor is disposed horizontally.

A vane pump according to an aspect of the invention includes: a cam ring defining a rotor chamber into which a first inlet port, a second inlet port, a first outlet port, and a second outlet port are open, the cam ring having an inner peripheral cam face having an elliptical shape; a rotor rotatably disposed in the rotor chamber such that an outer peripheral surface of the rotor faces the inner peripheral cam face, the rotor having a plurality of slits opening on the outer peripheral surface of the rotor and extending in a radial manner; and a plurality of vanes housed at least partially in the respective slits, the plurality of vanes configured to rotate together with the rotor, and the plurality of vanes defining a plurality of pump chambers between the inner peripheral cam face and the outer peripheral surface of the rotor. A first pressure transition step in which a fluid sucked into the pump chambers from the first inlet port is discharged into the first outlet port and a second pressure transition step in which a fluid sucked into the pump chambers from the second inlet port is discharged into the second outlet port are performed at the same time as the rotor rotates. A first back-pressure groove and a second back-pressure groove are open into the rotor chamber. The first back-pressure groove is communicated with some of the plurality of slits to supply a back pressure from the first outlet port to the corresponding vanes. The second back-pressure groove is communicated with other slits of the plurality of slits to supply a back pressure from the second outlet port to the corresponding vanes. The vanes to which the back pressure is supplied from the first back-pressure groove include vanes defining the pump chambers into which the fluid is sucked from the second inlet port in the second pressure transition step.

Even when the axis of rotation of the rotor is disposed horizontally, the vane pump according to the invention allows a quick increase in the pressure of the fluid in the first and the second outlet ports when the rotor starts rotating.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
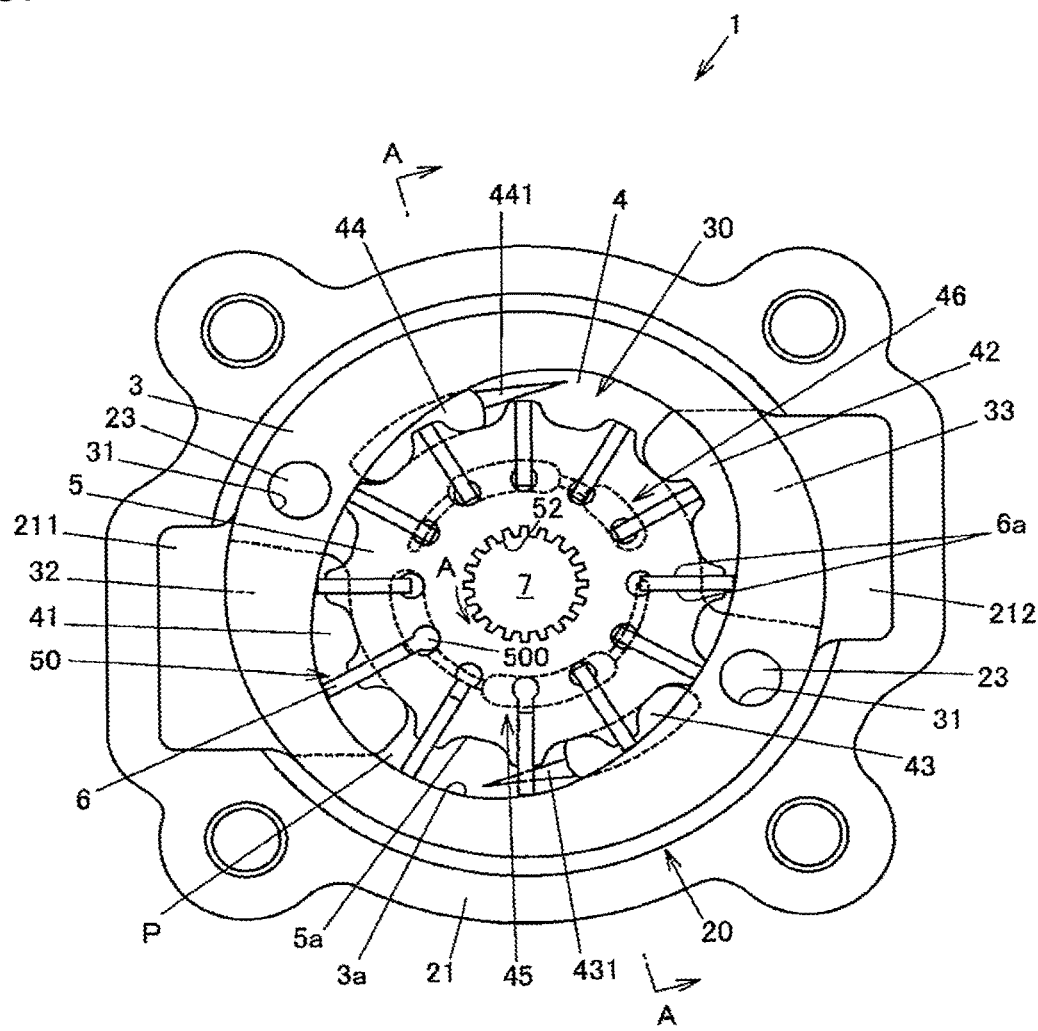
FIG. 1 is a diagram schematically illustrating the configuration of a vane pump according to an embodiment of the invention.

Hereinafter, an embodiment of the invention will be described with reference to FIGS. 1 to 5.

A vane pump 1 is used for an automatic transmission configured to change the speed of rotation output from a driving source (engine) of an automobile based on, for example, a vehicle speed. The vane pump 1 supplies a hydraulic fluid, which is a fluid, to an actuator configured to operate the automatic transmission.

The configuration of the vane pump 1 will be described below. The vane pump 1 includes a pump housing 2, a cam ring 3 and a side plate 4 that are housed in the pump housing 2, a rotor 5 rotatably disposed in the cam ring 3, a plurality of vanes 6 configured to rotate together with the rotor 5, and a pump shaft 7 coupled to the rotor 5 so as to be non-rotatable relative to the rotor 5. The pump shaft 7 receives torque, via a chain or a gear mechanism, from a driving shaft coupled to a turbine runner that is an output member for a torque converter. The torque converter includes a pump impeller coupled to a crankshaft of the engine, the turbine runner disposed coaxially with the pump impeller, and a stator disposed between the pump impeller and the turbine runner. The pump shaft 7 rotates in a direction indicated by an arrow A in FIG. 1. Hereinafter, a direction parallel to the axis of rotation of the pump shaft 7 will be referred to as "axial direction".

Figure 2:
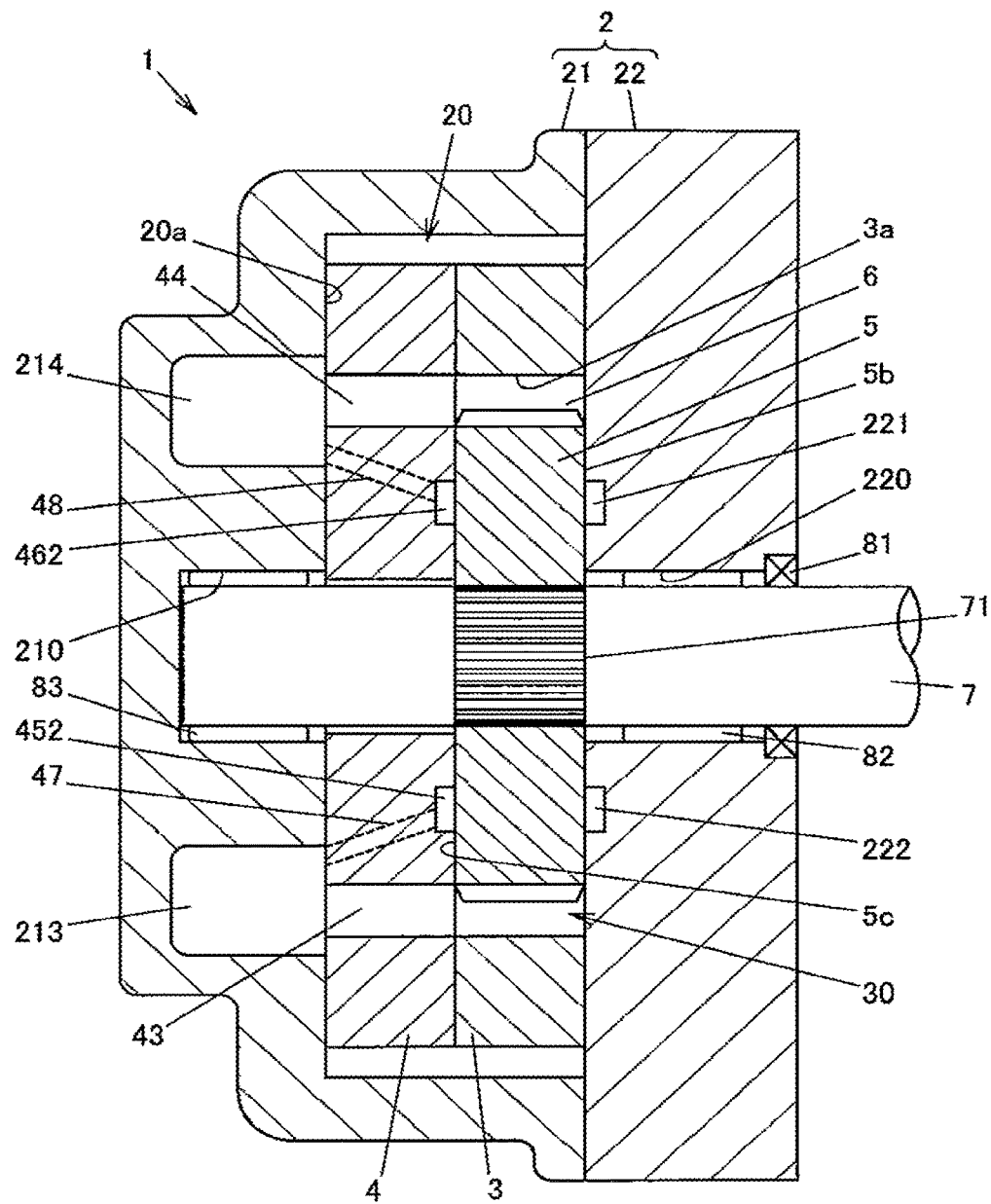
FIG. 2 is a sectional view of the vane pump.

As illustrated in FIG. 2, the pump housing 2 includes a housing main body 21 defining a housing space 20, and a housing cover 22 that closes an opening of the housing space 20 in the housing main body 21. The housing main body 21 and the housing cover 22 are fastened together with bolts (not illustrated). The housing main body 21 and the housing cover 22 are made of, for example, an aluminum-based metal material (aluminum alloy), and are formed through die casting. FIG. 1 illustrates the inside of the housing space 20 with illustration of the housing cover 22 omitted. FIG. 2 is a sectional view of the vane pump 1 taken along line A-A in FIG. 1.

The cam ring 3 and the side plate 4 are housed in the housing space 20. The side plate 4 is disposed on a bottom surface 20a of the housing space 20. The cam ring 3 is disposed between the side plate 4 and the housing cover 22.

The cam ring 3 and the side plate 4 are made of, for example, an iron-based metal material, and are formed through sintering.

The housing main body 21 has a first introduction portion 211 and a second introduction portion 212 (see FIG. 1) into which a hydraulic fluid is introduced from an inlet passage (not illustrated). The first introduction portion 211 and the second introduction portion 212 are communicated with the housing space 20. The housing main body 21 has a first outlet passage 213 and a second outlet passage 214 (see FIG. 2) that are open on the bottom surface 20a of the housing space 20. In the pump housing 2, the pressure of the hydraulic fluid supplied from an oil reservoir to the first and second introduction portions 211, 212 is increased. Then, the hydraulic fluid having an increased pressure is supplied to hydraulic-pressure supply destinations from the first and second outlet passages 213, 214. The pump housing 2 is disposed such that the lower side of the pump housing 2 illustrated in FIG. 1 and FIG. 2 corresponds to the lower side thereof in a vertical direction. The axis of rotation of the pump shaft 7 is disposed horizontally.

The pump shaft 7 extends through an insertion hole 220 of the housing cover 22, and one end of the pump shaft 7 is housed in a blind hole 210 of the housing main body 21. A seal member 81 is disposed in the insertion hole 220 of the housing cover 22. The seal member 81 seals a space between an inner peripheral surface of the housing cover 22, which defines the insertion hole 220, and an outer peripheral surface of the pump shaft 7. The pump shaft 7 is rotatably supported by a plurality of cylindrical rollers 82 housed in the insertion hole 220 of the housing cover 22 and a plurality of cylindrical rollers 83 housed in the blind hole 210 of the housing main body 21.

As viewed from an axial direction along the axis of rotation of the rotor 5, an outer peripheral surface of the cam ring 3 has a circular shape and an inner peripheral surface of the cam ring 3 has an elliptical shape. The inner peripheral surface of the cam ring 3 serves as an inner peripheral cam face 3a. Distal end portions of the vanes 6 are brought into contact with the inner peripheral cam face 3a. That is, the cam ring 3 has the inner peripheral cam face 3a having an elliptical shape as viewed from the axial direction. A rotor chamber 30 in which the rotor 5 is disposed is formed in an inner space of the cam ring 3, which is surrounded by the inner peripheral cam face 3a.

The cam ring 3 has a pair of through-holes 31. A pair of columnar protrusions 23 is erected on the bottom surface 20a of the housing space 20 in the housing main body 21. The columnar protrusions 23 extend through the through-holes 31. With this configuration, the cam ring 3 is non-rotatable relative to the pump housing 2.

Figure 3A:
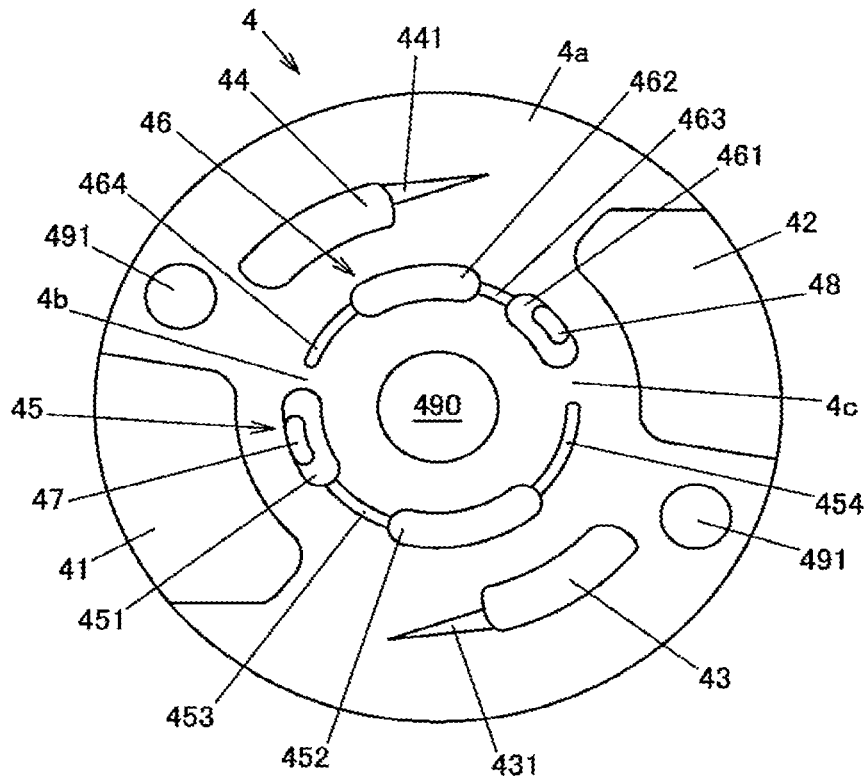
FIG. 3A is a plan view illustrating a side plate of the vane pump.

As illustrated in FIG. 3A, the side plate 4 has a first inlet port 41, a second inlet port 42, a first outlet port 43, a second outlet port 44, a first back-pressure groove 45, and a second back-pressure groove 46. The inlet ports 41, 42, the outlet ports 43, 44, and the back-pressure grooves 45, 46 are recessed portions that are recessed in the axial direction from a flat surface 4a of the side plate 4 that defines the rotor chamber 30 together with the inner peripheral cam face 3a of the cam ring 3. The inlet ports 41, 42, the outlet ports 43, 44, and the back-pressure grooves 45, 46 are open into the rotor chamber 30. The housing cover 22 has a circular-arc groove 222 at such a position that the circular-arc groove 222 faces the first back-pressure groove 45. In addition, the housing cover 22 has a circular-arc groove 221 at such a position that the circular-arc groove 221 faces the second back-pressure groove 46.

The first outlet port 43 is communicated with the first outlet passage 213. The second outlet port 44 is communicated with the second outlet passage 214. The first outlet passage 213 is communicated with the first back-pressure groove 45 via a first back-pressure introduction passage 47 provided in the side plate 4. The second outlet passage 214 is communicated with the second back-pressure groove 46 via a second back-pressure introduction passage 48 provided in the side plate 4. In FIG. 2, the first and second back-pressure introduction passages 47, 48 are indicated by dashed lines.

The first back-pressure groove 45 and the second back-pressure groove 46 extend within different angular ranges along a rotation direction of the rotor 5. The first back-pressure groove 45 and the second back-pressure groove 46 are concentric with each other, and have a circular arc shape. In the flat surface 4a of the side plate 4, areas between the opening of the first back-pressure groove 45 and the opening of the second back-pressure groove 46 are defined as a first seal surface 4b and a second seal surface 4c. The first and second seal surfaces 4b, 4c prevent the first back-pressure groove 45 and the second back-pressure groove 46 from being directly communicated with each other.

When the vane pump 1 is mounted in an automobile, the first outlet port 43 is positioned below the axis of rotation of the pump shaft 7, and the second outlet port 44 is positioned above the axis of rotation of the pump shaft 7. The side plate 4 has a first tapered groove 431 extending from the first outlet port 43 such that the opening area of the first tapered groove 431 decreases gradually in a direction opposite to the rotation direction of the rotor 5. Further, the side plate 4 has a second tapered groove 441 extending from the second outlet port 44 such that the opening area of the second tapered groove 441 decreases gradually in the direction opposite to the rotation direction of the rotor 5.

The side plate 4 has an insertion hole 490 through which the pump shaft 7 extends, and a pair of through-holes 491 through which the columnar protrusions 23 extend. The side plate 4 is non-rotatable relative to the pump housing 2.

The cam ring 3 has a first communication passage 32 and a second communication passage 33 that are defined in an axial end surface facing the flat surface 4a of the side plate 4. The first communication passage 32 provides communication between the first introduction portion 211 of the pump housing 2 and the first inlet port 41. The second communication passage 33 provides communication between the second introduction portion 212 of the pump housing 2 and the second inlet port 42. In FIG. 1, the contours of the first communication passage 32 and the second communication passage 33 are indicated by dashed lines.

The rotor 5 is rotatably disposed in the rotor chamber 30 such that an outer peripheral surface 5a of the rotor 5 faces the inner peripheral cam face 3a of the cam ring 3. The rotor 5 is a disc-shaped sintered compact obtained by sintering powder made of, for example, an iron-based metal. A fitting hole 52 into which the pump shaft 7 is fitted is defined in a central portion of the rotor 5. In the present embodiment, a spline fitting portion 71 of the pump shaft 7 is spline-fitted into the fitting hole 52 of the rotor 5. The rotor 5 is non-rotatable relative to the pump shaft 7, and rotates together with the pump shaft 7.

Figure 3B:
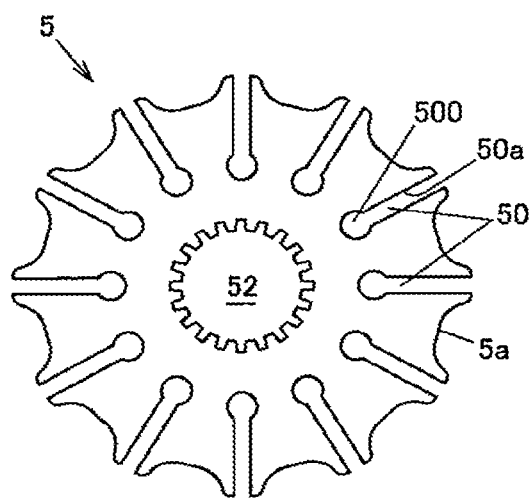
FIG. 3B is a plan view illustrating a rotor of the vane pump.

As illustrated in FIG. 3B, the rotor 5 has a plurality of (twelve, in the present embodiment) slits 50 opening on the outer peripheral surface 5a and extending in a radial manner. The slits 50 pass through the rotor 5 in the axial direction. The vanes 6, having a flat-plate shape, are housed in the respective slits 50 so as to be movable in a radial direction of the rotor 5. Each of the vanes 6 is at least partially housed in a corresponding one of the corresponding slits 50, a distal end portion of the vane 6 protrudes from the outer peripheral surface 5a of the rotor 5, and side surfaces 6a of the vane 6 are in sliding contact with guide surfaces 50a (described below) of inner surfaces of the slit 50.

At radially-inner side end portions (end portions closer to the center of the rotor 5) of the slits 50, back-pressure chambers 500 are provided. The back-pressure chambers 500 are communicated with the first back-pressure groove 45 and the second back-pressure groove 46. The back-pressure chambers 500 are communicated with the first back-pressure groove 45 within a prescribed angular range in the rotation direction of the rotor 5, and are communicated with the second back-pressure groove 46 within another prescribed angular range in the rotation direction of the rotor 5. That is, the first back-pressure groove 45 is communicated with some of the slits 50 to supply a back pressure from the first outlet port 43 to the vanes 6. The second back-pressure groove 46 is communicated with others of the slits 50 to supply a back pressure from the second outlet port 44 to the vanes 6.

The width of each of the slits 50 in a circumferential direction of the rotor 5 is set such that the width of the back-pressure chamber 500 is larger than the width of a portion of the slit 50 which is radially outward of the back-pressure chamber 500. A back pressure acting in a direction in which vanes 6 are pushed out of the rotor 5 through the slits 50 is supplied to the back-pressure chambers 500 through the first back-pressure groove 45 and the second back-pressure groove 46. Upon receiving the back pressure, the distal end portions of the vanes 6 come into contact with the inner peripheral cam face 3a.

As illustrated in FIG. 3A, the first back-pressure groove 45 includes a deep groove 451 provided radially inward of the first inlet port 41 and communicated with the first back-pressure introduction passage 47, a shallow groove 452 provided radially inward of the first outlet port 43, a communication groove 453 that provides communication between the deep groove 451 and the shallow groove 452, and an extension groove 454 extending in the rotation direction of the rotor 5 from an end of the shallow groove 452, which is on the opposite side of the shallow groove 452 from the communication groove 453.

Similarly, the second back-pressure groove 46 includes a deep groove 461 provided radially inward of the second inlet port 42 and communicated with the second back-pressure introduction passage 48, a shallow groove 462 provided radially inward of the second outlet port 44, a communication groove 463 that provides communication between the deep groove 461 and the shallow groove 462, and an extension groove 464 extending in the rotation direction of the rotor 5 from an end of the shallow groove 462, which is on the opposite side of the shallow groove 462 from the communication groove 463.

The vanes 6 receive the back pressure supplied to the back-pressure chambers 500 from the first back-pressure groove 45 and the second back-pressure groove 46, and forms a plurality of pump chambers P between the inner peripheral cam face 3a and the outer peripheral surface 5a of the rotor 5. In other words, the rotor chamber 30 between the inner peripheral cam face 3a and the outer peripheral surface 5a of the rotor 5 is partitioned into the pump chambers P by the vanes 6. Each of pump chambers P is a reservoir space for the hydraulic fluid, which is defined by the inner peripheral cam face 3a, the outer peripheral surface 5a of the rotor 5, and a pair of vanes 6 that are adjacent to each other in the circumferential direction of the rotor 5.

The volume of each pump chamber P increases as the pump chamber P moves from a minor-axis portion of the inner peripheral cam face 3a having an elliptical shape toward a major-axis portion thereof, and the volume of each pump chamber P decreases as the pump chamber P moves from the major-axis portion of the inner peripheral cam face 3a toward the minor-axis portion thereof. The hydraulic fluid flows into the pump chamber P from the first inlet port 41 or the second inlet port 42 as the volume thereof increases, and the hydraulic fluid is discharged into the first outlet port 43 or the second outlet port 44 as the volume of the pump chamber P decreases.

The vane pump 1 performs a first pressure transition step and a second pressure transition step at the same time, as the rotor 5 rotates together with the vanes 6 in the direction indicated by the arrow A. In the first pressure transition step, the hydraulic fluid sucked into the pump chambers P through the first inlet port 41 is discharged into the first outlet port 43. In the second pressure transition step, the hydraulic fluid sucked into the pump chambers P through the second inlet port 42 is discharged into the second outlet port 44. The first pressure transition step includes a suction step in which the hydraulic fluid is sucked into the pump chambers P from the first inlet port 41 and a discharge step in which the hydraulic fluid sucked into the pump chambers P is discharged into the first outlet port 43. Similarly, the second pressure transition step includes a suction step in which the hydraulic fluid is sucked into the pump chambers P from the second inlet port 42 and a discharge step in which the hydraulic fluid sucked into the pump chambers P is discharged into the second outlet port 44.

The first back-pressure groove 45 is positioned below the second back-pressure groove 46. The first back-pressure groove 45 supplies a back pressure to the vanes 6 defining the pump chambers P where the first pressure transition step is mainly performed. The second back-pressure groove 46 supplies a back pressure to the vanes 6 defining the pump chambers P where the second pressure transition step is performed. In the discharge step of the first pressure transition step, the vanes 6 move toward the deep portions of the slits 50 (toward the back-pressure chambers 500) as the volume of each of the pump chambers P decreases. Consequently, the hydraulic fluid in the slits 50 is discharged into the shallow groove 452 of the first back-pressure groove 45, and the discharged hydraulic fluid is supplied to the deep groove 451 through the communication groove 453. Similarly, in the discharge step of the second pressure transition step, the vanes 6 move toward the deep portions of the slits 50 (toward the back-pressure chambers 500) as the volume of each of the pump chamber P decreases. Consequently, the hydraulic fluid in the slits 50 is discharged into the shallow groove 462 of the second back-pressure groove 46, and the discharged hydraulic fluid is supplied to the deep groove 461 through the communication groove 463.

The hydraulic fluid discharged into the first outlet port 43 is discharged out of the pump housing 2 through the first outlet passage 213, and the hydraulic fluid discharged into the second outlet port 44 is discharged out of the pump housing 2 through the second outlet passage 214. The hydraulic fluid discharged from the first outlet passage 213 and the hydraulic fluid discharged from the second outlet passage 214 are supplied to the hydraulic-pressure supply destinations, such as an actuator, via throttle valves. The throttling amount of each throttle valve is set based on the hydraulic pressure required by the hydraulic-pressure supply destination. A discharge pressure at the first outlet port 43 and a discharge pressure at the second outlet port 44 are each determined based on the throttling amount.

As described above, the pump shaft 7 is rotated by the engine torque transmitted via the torque converter. Thus, when the engine stops, the rotor 5 also stops rotating. In this case, the vanes 6 positioned above the axis of rotation of the pump shaft 7 may move into the deep portions of the slits 50 under their own weight, as illustrated in FIG. 1. In this state, when the rotor 5 starts rotating, no pump chamber P is defined on the upper side of the rotor 5. As a result, the second pressure transition step is not performed normally, and a back pressure is not introduced from the second back-pressure groove 46. When this state continues, the vanes 6 moved into the deep portions of the slits 50 at the minor-axis portion of the inner peripheral cam face 3a between the first outlet port 43 and the second inlet port 42 do not protrude outward, and the vanes 6 in this state rotate together with the rotor 5. As a result, a state where the pressure in the second outlet port 44 does not increase continues.

In the vane pump 1 according to the present embodiment, the back pressure is supplied from the first back-pressure groove 45 to at least one of the vanes 6 defining the pump chambers P where the suction step of sucking the hydraulic fluid from the second inlet port 42 is performed in the second pressure transition step. Consequently, even in a state where no back pressure is introduced from the second back-pressure groove 46, the vane 6 at a position corresponding to the second inlet port 42 is caused to protrude by the back pressure. That is, in the present embodiment, the vanes 6 to which the back pressure is supplied from the first back-pressure groove 45 include the vanes 6 defining the pump chambers P into which the hydraulic fluid is sucked from the second inlet port 42 in the second pressure transition step.

More specifically, the extension groove 454 of the first back-pressure groove 45 extends to a position radially inward of the second inlet port 42, as illustrated in FIG. 3A. The deep groove 461 of the second back-pressure groove 46 is shorter, in length in the rotation direction of the rotor 5, than the deep groove 451 of the first back-pressure groove 45. The second seal surface 4c is provided in the flat surface 4a of the side plate 4, at a position between the opening of the extension groove 454 of the first back-pressure groove 45 and the opening of the deep groove 461 of the second back-pressure groove 46. The width of the second seal surface 4c in the rotation direction of the rotor 5 is greater than the width of the back-pressure chamber 500 intersecting with the seal surface 4c. This prevents the extension groove 454 of the first back-pressure groove 45 from being communicated with the deep groove 461 of the second back-pressure groove 46 through the back-pressure chamber 500.

In the side plate 4, a part of the extension groove 454 of the first back-pressure groove 45, the deep groove 461 of the second back-pressure groove 46, and the communication groove 463 of the second back-pressure groove 46 are provided at positions radially inward of the second inlet port 42 (at positions close to the insertion hole 490). Thus, the vanes 6 defining the pump chambers P where the suction step of sucking the hydraulic fluid from the second inlet port 42 is performed in the second pressure transition step, receive the back pressure from the first back-pressure groove 45 in an initial stage of the suction step, and receive the back pressure from the second back-pressure groove 46 in a latter stage of the suction step.

The back-pressure chambers 500 that applies the back pressure to the vanes 6 intersecting with the second inlet port 42 as viewed from the axial direction initially are communicated with the extension groove 454 of the first back-pressure groove 45, then intersect with the second seal surface 4c, and subsequently are communicated with the deep groove 461 of the second back-pressure groove 46, as the rotor 5 rotates. The vanes 6 receive the back pressure from the first back-pressure groove 45 while the back-pressure chambers 500 are communicated with the extension groove 454 of the first back-pressure groove 45, and receive the back pressure from the second back-pressure groove 46 while the back-pressure chambers 500 are communicated with the deep groove 461 of the second back-pressure groove 46.

Figure 4A:
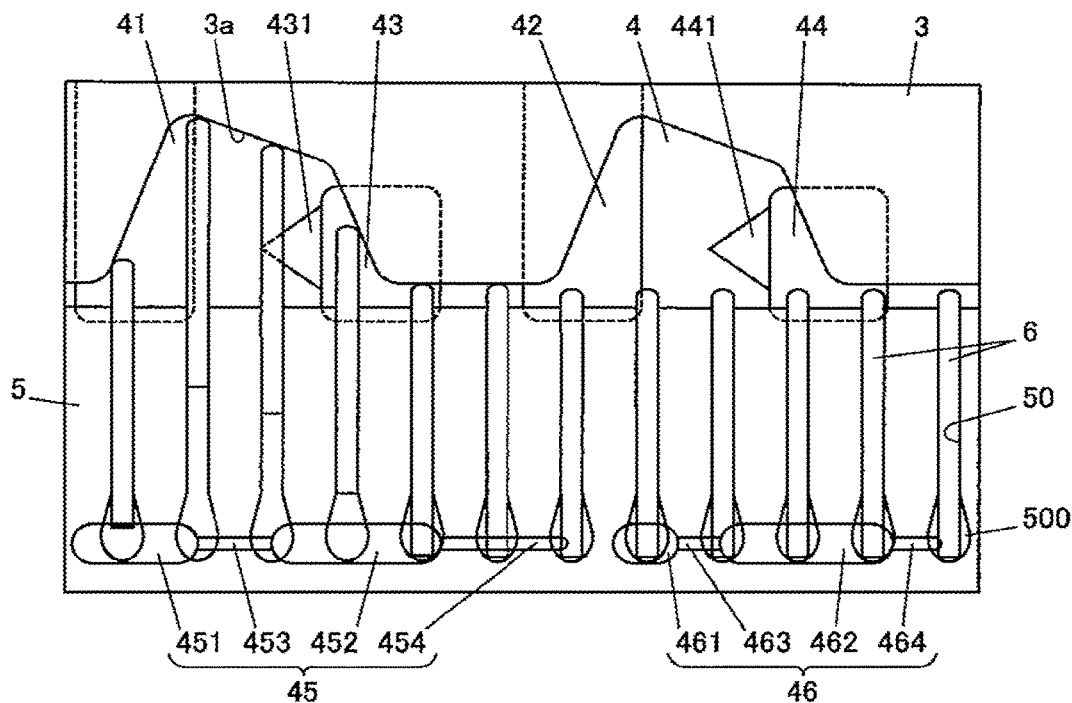
FIG. 4A is a development view schematically illustrating the vane pump.
Figure 4B:
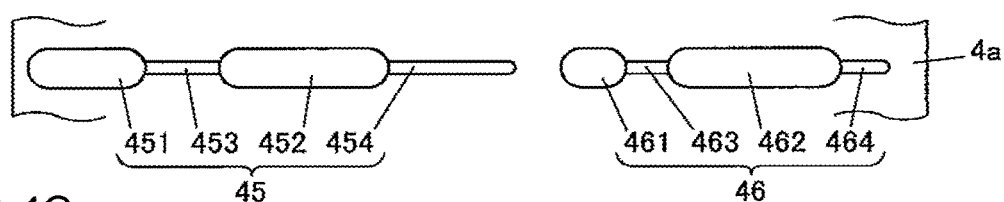
FIG. 4B is a diagram illustrating a first back-pressure groove and a second back-pressure groove in FIG. 4A.
Figure 4C:
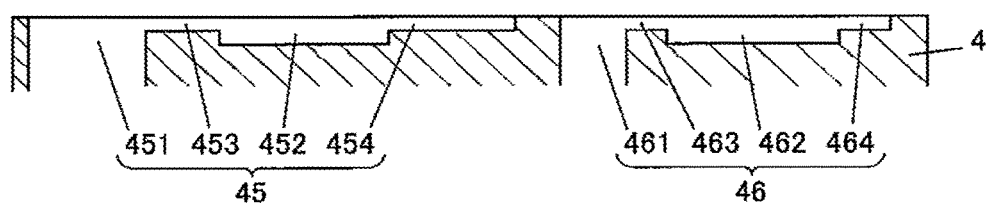
FIG. 4C is a sectional view illustrating the first back-pressure groove and the second back-pressure groove.

FIG. 4A is a development view schematically illustrating the vane pump 1 in a stationary state illustrated in FIG. 1. In FIG. 4A, the vanes 6 disposed in the circumferential direction of the rotor 5 are illustrated such that the vanes 6 are arranged linearly. FIG. 4B is a diagram illustrating the first back-pressure groove 45 and the second back-pressure groove 46 in FIG. 4A. FIG. 4C is a sectional view corresponding to FIG. 4B and illustrating the first back-pressure groove 45 and the second back-pressure groove 46 in a section taken along the circumferential direction of the side plate 4.

As illustrated in FIG. 4B, the communication groove 453 and the extension groove 454 of the first back-pressure groove 45 are smaller in width than the deep groove 451 and the shallow groove 452. Similarly, the communication groove 463 and the extension groove 464 of the second back-pressure groove 46 are smaller in width than the deep groove 461 and the shallow groove 462. As illustrated in FIG. 4C, in a direction perpendicular to the flat surface 4a of the side plate 4, the shallow groove 452 of the first back-pressure groove 45 is smaller in depth than the deep groove 451, and the communication groove 453 and the extension groove 454 are smaller in depth than the shallow groove 452. Similarly, the shallow groove 462 of the second back-pressure groove 46 is smaller in depth than the deep groove 461, and the communication groove 463 and the extension groove 464 are smaller in depth than the shallow groove 462.

In the stationary state of the vane pump 1 illustrated in FIG. 4A, the vanes 6 defining the pump chambers P where the first pressure transition step is performed protrude from the slits 50 of the rotor 5 such that the distal end portions of the vanes 6 come into contact with the inner peripheral cam face 3a. In contrast to this, the vanes 6 defining the pump chambers P where the second pressure transition step is performed move into the deep portions of the slits 50 under their own weight.

Figure 5A:
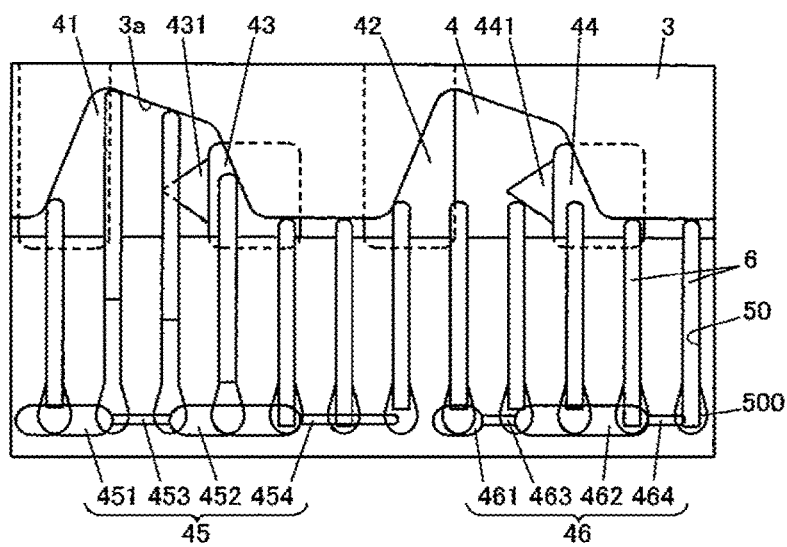
FIG. 5A is a state diagram illustrating a state of the vane pump.

FIG. 5A is a diagram illustrating the state of the vane pump 1 at the start of rotation of the rotor 5. When the rotor 5 starts rotating, the first pressure transition step is performed to increase the pressure of the hydraulic fluid in the first outlet port 43. The pressure in the first outlet port 43 is introduced into the first back-pressure groove 45 through the first back-pressure introduction passage 47. Thus, the vanes 6 housed in the slits 50 having the back-pressure chambers 500 communicated with the first back-pressure groove 45 are caused to protrude by the back pressure.

In the present embodiment, the extension groove 454 of the first back-pressure groove 45 extends to a position radially inward of the second inlet port 42. Thus, the back pressure from the second inlet port 42 is supplied also to some of the vanes 6 defining the pump chambers P into which the hydraulic fluid is sucked from the second inlet port 42 in the second pressure transition step. Thus, even when the pressure in the second outlet port 44 has not increased, the vanes 6 that have received the back pressure from the first back-pressure groove 45 protrude toward the second inlet port 42. FIG. 5A illustrates a state where the back pressure from the first back-pressure groove 45 has caused the vanes 6 at positions corresponding to the second inlet port 42 to protrude by a prescribed amount.

The vanes 6 at positions corresponding to the second inlet port 42 are caused to protrude in this way. Thus, the vanes 6, which rotate together with the rotor 5, supply the hydraulic fluid into the second outlet port 44. Consequently, the pressure of the hydraulic fluid in the second outlet port 44 increases, and the increased pressure is introduced into the second back-pressure groove 46 through the second back-pressure introduction passage 48. The back pressure causes the vanes 6 housed in the slits 50 having the back-pressure chambers 500 communicated with the second back-pressure groove 46 to be pushed out.

Figure 5B:
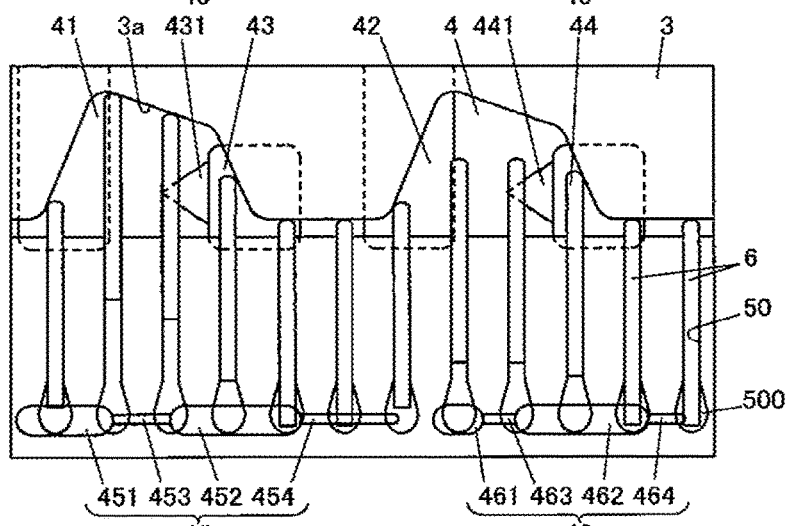
FIG. 5B is a state diagram illustrating another state of the vane pump.
Figure 5C:
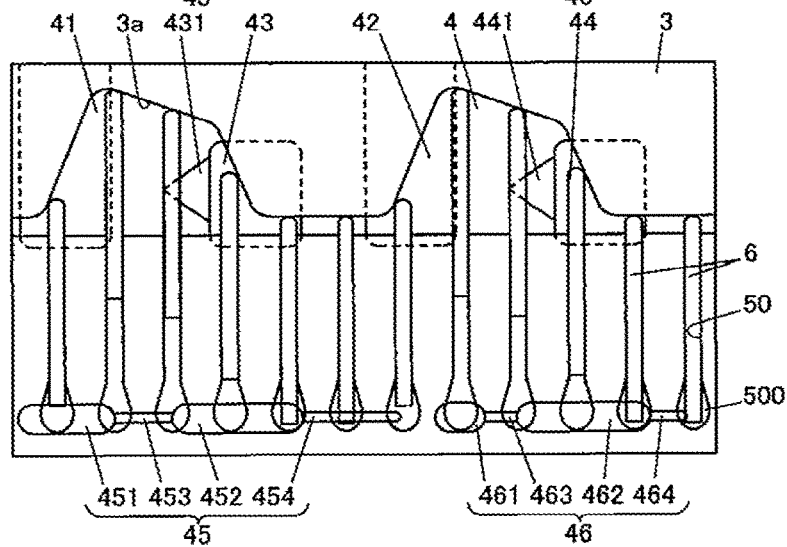
FIG. 5C is a state diagram illustrating another state of the vane pump.

FIG. 5B illustrates a state where the back pressure supplied to the back-pressure chambers 500 from the second back-pressure groove 46 has increased the amount by which the vanes 6 protrude from the slits 50. As the amount by which the vanes 6 protrude from the slits 50 increases, the pressure of the hydraulic fluid in the second outlet port 44 is further increased and the amount by which the vanes 6 protrude from the slits 50 is further increased. Then, as illustrated in FIG. 5C, when the distal end portions of the vanes 6 come into contact with the inner peripheral cam face 3a, the second pressure transition step is normally performed to allow the vane pump 1 to operate stably.

The advantageous effects and operation of the foregoing embodiment will be described below. In the foregoing embodiment, the back pressure from the first back-pressure groove 45 is applied to the some of the vanes 6 defining the pump chambers P into which the hydraulic fluid is sucked from the second inlet port 42 in the second pressure transition step. Thus, the vanes 6 protrude toward the second inlet port 42 even when the pressure in the second outlet port 44 has not increased. The protrusion of the vanes 6 triggers an increase in the pressure in the second inlet port 42, and the increased pressure is introduced into the second back-pressure groove 46. Consequently, when the rotor 5 starts rotating, the pressure of the hydraulic fluid in the first and second outlet ports 43, 44 can be quickly increased.

The vanes 6 defining the pump chambers P where the suction step of sucking the hydraulic fluid from the second inlet port 42 is performed in the second pressure transition step, receive the back pressure from the second back-pressure groove 46 in the latter stage of the suction step. Thus, the vanes 6 intersecting with the second inlet port 42 are pushed out of the slit 50 by the back pressure corresponding to the discharge pressure in the second outlet port 44. Consequently, even when the discharge pressure in the second outlet port 44 is higher than the discharge pressure in the first outlet port 43, the suction step of sucking the hydraulic fluid from the second inlet port 42 can be reliably performed.

What is claimed is:
1. A vane pump comprising:
   a cam ring defining a rotor chamber into which a first inlet port, a second inlet port, a first outlet port, and a second outlet port are open, the cam ring having an inner peripheral cam face having an elliptical shape;
   a rotor rotatably disposed in the rotor chamber such that an outer peripheral surface of the rotor faces the inner peripheral cam face, the rotor having a plurality of slits opening on the outer peripheral surface of the rotor and extending in a radial manner; and a plurality of vanes housed at least partially in the respective slits, the plurality of vanes configured to rotate together with the rotor, and the plurality of vanes defining a plurality of pump chambers between the inner peripheral cam face and the outer peripheral surface of the rotor, wherein a first pressure transition step in which a fluid sucked into the pump chambers from the first inlet port is discharged into the first outlet port and a second pressure transition step in which a fluid sucked into the pump chambers from the second inlet port is discharged into the second outlet port are performed at the same time as the rotor rotates, a first back-pressure groove and a second back-pressure groove are open into the rotor chamber, the first back-pressure groove being communicated with some of the plurality of slits to supply a back pressure from the first outlet port to the corresponding vanes, and the second back-pressure groove being communicated with other slits of the plurality of slits to supply a back pressure from the second outlet port to the corresponding vanes, the vanes to which the back pressure is supplied from the first back-pressure groove include the vanes defining the pump chambers into which the fluid is sucked from the second inlet port in the second pressure transition step, the first back-pressure groove includes a first portion radially inward of the first inlet port, a second portion radially inward of the first output port, and a third portion radially inward from the second inlet port, and a first and a second seal surfaces configured to prevent the first back-pressure groove and the second back-pressure groove from directly communication with each other.

2. The vane pump according to claim 1, wherein the vanes defining the pump chambers where a suction step of sucking the fluid from the second inlet port in the second pressure transition step, receive the back pressure from the first back-pressure groove in an initial stage of the suction step, and receive the back pressure from the second back-pressure groove in a latter stage of the suction step.

3. The vane pump according to claim 1, wherein the second back-pressure groove includes a first portion radially inward of the second inlet port and a second portion radially inward of the second output port, and a third portion radially inward from the second outlet port.

4. The vane pump according to claim 1, wherein the first portion of the first back-pressure groove includes a first back-pressure introduction passage that communicates with a hack-pressure chamber of the vane pump.

* * * * *